United States Patent [19]

Bingham et al.

[11] E Re. 30,892

[45] Reissued Mar. 30, 1982

[54] AREA-RETROREFLECTORIZATION OF FABRICS

[75] Inventors: Wallace K. Bingham, North Saint Paul; Terry R. Bailey, Woodbury, both of Minn.

[73] Assignee: Minnesota Mining and Manufacturing Company, St. Paul, Minn.

[21] Appl. No.: 29,702

[22] Filed: Apr. 11, 1979

Related U.S. Patent Documents

Reissue of:

[64] Patent No.: 4,103,060
Issued: Jul. 25, 1978
Appl. No.: 766,332
Filed: Feb. 7, 1977

U.S. Applications:

[63] Continuation-in-part of Ser. No. 540,286, Jan. 10, 1975, abandoned.

[51] Int. Cl.[3] ..... B32B 5/16; B32B 17/06

[52] U.S. Cl. ..... 428/241; 350/97; 350/105; 350/109; 427/162; 427/163; 427/199; 427/204; 427/205; 427/412; 428/426; 428/433; 428/446; 428/450; 428/457

[58] Field of Search ..... 428/241, 433, 426, 446, 428/450, 457; 427/163, 162, 412, 205, 204, 199; 350/105, 109, 97

[56] References Cited

U.S. PATENT DOCUMENTS

| | | | |
|---|---|---|---|
| 2,567,233 | 9/1951 | Palmquist | 428/246 |
| 2,581,549 | 1/1952 | McGaugh | 350/98 |
| 2,582,132 | 1/1952 | Kaphan | 428/57 |
| 3,377,184 | 4/1968 | Kukoff | 428/88 |
| 3,535,019 | 10/1970 | Longlet et al. | 428/433 |
| 3,551,025 | 12/1970 | Bingham et al. | 350/105 |
| 3,563,781 | 2/1971 | Johnson | 427/202 |
| 3,700,305 | 10/1972 | Bingham | 350/105 |
| 3,758,192 | 9/1973 | Bingham | 350/105 |
| 3,790,431 | 2/1974 | Tung | 428/338 |

*Primary Examiner*—Ronald H. Smith
*Assistant Examiner*—Janyce A. Bell
*Attorney, Agent, or Firm*—Cruzan Alexander; Donald M. Sell; Roger R. Tamte

[57] ABSTRACT

Retroreflective-treated fabrics, and products and methods for forming the treatments are taught. As an example, a free-flowing mass of minute retroreflectorization particles that each comprise hemispherically reflectorized transparent microspheres supported in a softenable binder material are cascaded onto a fabric. The binder material is softened during application to provide adhesion of the particles to the fabric. A very sparse retroreflective treatment can be provided, which leaves the fabric with nearly its full original appearance as well as hand, feel, and breathability. Yet the treatment will greatly increase the safety of a pedestrian by making him visible at night.

40 Claims, 4 Drawing Figures

AREA-RETROREFLECTORIZATION OF FABRICS

Matter enclosed in heavy brackets [ ] appears in the original patent but forms no part of this reissue specification; matter printed in italics indicates the additions made by reissue.

REFERENCE TO RELATED APPLICATION

This application is a continuation-in-part of pending application Ser. No. 540,286, filed Jan. 10, 1975, now abandoned.

BACKGROUND OF THE INVENTION

The present invention is directed toward a need, as we conceive it, for a retroreflective treatment for fabrics that is so inconspicuous in daylight and of so little effect on hand, feel, and breathability, that garments made from the fabric will be widely worn by pedestrians; and that yet is so brightly retroreflective that the pedestrians will be readily visible at night for several hundred feet and more under illumination from oncoming motorists.

The need to increase the visibility of pedestrians walking along streets or highways at nighttime has long been recognized. A three-year study of 12 United States cities having populations of more than 500,000 found that 50 percent of the total nighttime traffic fatalities were pedestrian deaths[1] (footnote references are at the end of the specification). And the accident rate per million vehicle-miles for all fatal and serious traffic accidents is 2½ to 3 times higher at night than it is during the day[2]. The low visibility of pedestrians during hours of darkness is a major factor in these statistics.

Reflectorized clothing would greatly increase the visibility of pedestrians at nighttime. Tests have demonstrated that motorists detect pedestrians clothed in reflectorized garments much earlier than they detect pedestrians clothed in nonreflectorized clothing. In one test,[3] pedestrians were simulated by placing boxes 12 inches by 12 inches by 48 inches (30 by 30 by 120 centimeters) covered with different test fabrics along a course traveled by test observers in cars. The fabrics tested were black, grey, white, and grey with a strip of silver reflectorized tape 1 inch by 11 inches attached horizontally 15 inches from the ground. The results of the tests in terms of the percentages of pedestrians who were safely visible to test observers at distances greater than "critical visibility distances" (reaction distance plus braking distance) are summarized in the following table:

| Simulated | Miles per Hour | | | |
|---|---|---|---|---|
| Pedestrians | 20 | 40 | 60 | 80 |
| Black | 86.4 | 45.4 | 0 | 0 |
| Grey | 100 | 47.2 | 5.5 | 0 |
| White | 100 | 100 | 97.2 | 52.7 |
| Reflectorized | 100 | 100 | 100 | 100 |

The problem is that very few persons wear reflectorized garments. Such garments were available at least by the late 1940's, and many efforts have been made over the years to promote their use. Only limited success has resulted from these efforts, undoubtedly because existing commercial reflective treatments for garments are conspicuous in daytime and do not permit a desired variety in fashion.

Retroreflective tapes have provided the most accepted way to reflectorize garments. These tapes typically comprise a monolayer containing many thousands of glass microspheres per square centimeter supported over specular reflective means in a flexible binder material (see Palmquist et al, U.S. Pat. No. 2,567,233, later patents teaching improved varieties include Bingham et al, U.S. Pat. No. 3,551,025, which teaches a wet-or-dry reflecting material having a flexible transparent flat-surfaced top layer over the layer of microspheres; Bingham, U.S. Pat. No. 3,700,305, which teaches the use of visibly transparent but reflective dielectric layers as the specular reflective means, and thus makes possible more variety in the underlying color of retroreflective materials; and Bingham, U.S. Pat. No. 3,758,192 which teaches retroreflective materials that use nacreous pigments underneath the microspheres to provide retroreflectivity while permitting variety in the color of the material). These tapes ordinarily have little resemblance to fabric to which they are applied, and their use on fabrics has generally been limited to situations where they serve as trim that is part of an ornamental design for the garment. By far the majority of outerwear garments do not use such tapes.

Limited or strip reflectorization can also be provided, as taught in Longlet et al, U.S. Pat. No. 3,535,019, with liquid coating compositions that comprise hemispherically-aluminum-covered glass microspheres dispersed in a water-emulsion of a flexible thermoplastic resin. Such liquid coating compositions have not been commercially successful probably because, as the patent states, "some relative stiffening of the fabric occurs in the area of the applied marking" (column 1, lines 61 and 62), and because the markings contemplated cause daytime conspicuity.

In a different approach, it has been suggested that pellets of a synthetic resin- or elastomer-based paste dissolved in a solvent be pressed onto a foil such as may be used for raincoats, after which glass microspheres are sprayed onto the pellets; see Swiss Pat. No. 514,731. Like other approaches, this suggestion contemplates visibly apparent treatments, but suggests use of forms that will contribute to decoration of the foil.

In another approach tried without success, retroreflective sheeting carrying a heat-activatable adhesive on its back surface was chopped into approximately 1/16-inch or ⅛-inch segments; the segments sprinkled onto a first piece of fabric; a second piece of the fabric laid over the sprinkled area; and the assembly heated and pressed, as with an iron. The retroreflective segments thus became adhered to one of the pieces of fabric, depending by chance on which fabric their adhesive side faced. Success was lacking, among other reasons, because the treatment was rather unattractive, with a scattering of irregularly shaped conspicuous segments; and the method was not adapted to rapid processes; e.g., the segments tended to clump together and did not cascade freely, apparently because the binder material of the segments was soft and flexible.

Others have suggested reflectorizing the whole fabric of a garment, but insofar as known, none of these has proved commercially or otherwise feasible. Carey et al, U.S. Pat. No. 2,937,668 teaches glass-microsphere-enveloped yarns for inclusion in small proportion with conventional yarns to form a composite fabric that could be made into garments. For a variety of reasons, such a technique has never been commercially successful. McGaugh, U.S. Pat. No. 2,581,549 suggests adhering conventional retroreflective sheeting over the back portion of a glove to provide brilliantly retroreflective signaling gloves, where daytime conspicuity is not an obstacle. Tung, U.S. Pat. No. 3,790,431 describes a reflectorized open-mesh fabric that is useful for many purposes, but as wearing apparel is generally used only as brilliantly retroreflective vests or jackets for police or highway construction or maintenance workers.

Certain decorative fabrics from the prior art have exhibited a limited reflectivity but not the retroreflectivity (a return of light along essentially the same path that the light traveled to the reflector, which, for example, provides a brilliant reflection to the driver of an automobile whose headlamps illuminate the reflector) that is needed to provide pedestrian safety. For example, Kaphan, U.S. Pat. No. 2,582,132 teaches ornamental "studded" fabrics that have enlarged round glossy plastic elements adhered over the surface of the fabric for decorative effects. Glass beads have also been adhered to fabrics for decorative effects, as indicated by Kukoff, U.S. Pat. No. 3,377,184, which suggests the use of plastic particles instead; but these beads have not been used in combination with underlying reflective means needed to turn the glass beads into a brilliantly retroreflective element. None of these decorative fabrics would appear to have any useful retroreflective effects.

In summary, no one has previously suceeded in providing a retroreflective treatment for wearing apparel that would both provide desired levels of safety and be fashionably acceptable over a wide range of outerwear garments. Until there is such a treatment, there can apparently only be limited improvements in pedestrian visibility at nighttime.

SUMMARY OF THE INVENTION

Briefly, a retroreflective treatment of the invention for fabrics that are to be worn comprises discrete retroreflective areas applied in a spaced, sparse manner over the surface of a base fabric. These retroreflective areas include a thin layer of binder material adhered to the base fabric and transparent microspheres supported or held in the binder material. At least about one-third of the microspheres have reflective means between them and the fabric whereby the microspheres are made retroreflective, and their surface that faces away from the fabric is optically exposed for receiving and returning the light rays. On the average there are less than about 2000 microspheres, and preferably less than about 500 microspheres, in any square centimeter of said surface of the fabric, and the smallest surface dimension (that is, a dimension along the surface of the fabric) of the continuous portions of said coating is no greater than about 0.5 centimeter.

A retroreflective treatment as described may be provided in different ways, but one method is at present very much preferred. This method uses a unique retroreflectorizing material, namely a free-flowing mass of minute retroreflectorization particles. These minute retroreflectorization particles each comprise one or more transparent microspheres arranged in a closely packed monolayer; a solid binder layer in which the microspheres are supported and which may at least in part be softened to adhere the particles to a substrate; and specular reflective means underlying the microspheres and supported by the binder material in optical connection with the microspheres to make the microspheres retroreflective. The surface of the microspheres opposite from the reflective means is optically exposed to receive and return light rays.

These retroreflectorization particles are generally applied by cascading, metering, or otherwise depositing them onto a base fabric under conditions that soften the binder layer. At least a portion of the cascaded particles become adhered to the base fabric with the optically exposed surface of the microspheres facing away from the fabric.

The particles may be applied in amounts that provide the density of microspheres per unit area of the fabric described above. Such treatments are unique in their combination of sparsity and area-wide character. For example, popular conventional retroreflective sheetings used in traffic control signs have a density over their surface of 25,000 microspheres per square centimeter, instead of the less than 2000 and preferably less than 500 microspheres per square centimeter on fabric of the invention.

Further, the particles are very small. For example, some typical retroreflectorization particles of the invention use 50-micrometer-diameter microspheres and mostly include only one to three microspheres. Such particles occupy about 1/50,000 of a square-centimeter-sized area, and in themselves are almost undetectable to the unaided eye.

On textured materials the particles preferably rest in recesses of the surface, which further reduces their visibility. Such a positioning in recesses can be encouraged by agitating a fabric or "ironing" it, that is, passing a heated plate over the fabric which tends to move the particles into the recesses.

We have found that when microspheres are used at the described low densities and in the described scattered or spaced arrangements, they are substantially invisible in daylight. That is, depending on the color and texture of the base fabric, a preferred treatment of the invention can often be detected only under unusual lighting conditions or by bringing the treated fabric to within several centimeters of the eye and manipulating the fabric to cause the microspheres to provide a sparkle of retroreflection. Treatments of the invention can accordingly be applied to a garment and leave the appearance of the garment only slightly changed, and preferably essentially unchanged, to an unstudied viewing.

Yet, because the sparse treatment extends over the whole area of a fabric, a surprising aggregate effect on reflectivity is achieved. Although the treatment is unnoticed on a garment under ordinary daylight viewing, the garment "lights up" when it is viewed at night under illumination from the headlamps of an approaching automobile and becomes strikingly visible. Typically, a pedestrian wearing a jacket made from a fabric of the invention is easily visible at 500 feet and more from an oncoming automobile under high-beam illumination at night, and in preferred embodiments is visible at such distances under low-beam illumination.

In presently less preferred versions the properties achieved with retroreflectorization particles are approached by using other reflectorizing materials and procedures. For example, a sparse discontinuous retroreflective treatment may be applied by printing a liquid coating composition to provide discrete small retroreflective areas having microsphere-densities per unit area of fabric as described above. Such printed fabrics are also of low daytime visibility and have little effect on hand, feel, or breathability. But upon illumination at nighttime they provide a surprising brightly visible reflection to an oncoming motorist.

All in all, retroreflective treatments of the invention constitute a "breakthrough" in retroreflectorization of garments. For the first time, pedestrians can be provided with retroreflective garments that are hardly different for most purposes from a conventional garment and yet will provide nighttime visibility sufficient to greatly improve their safety.

DETAILED DESCRIPTION

The invention will first be illustrated by two examples.

EXAMPLE 1

Figure 1:
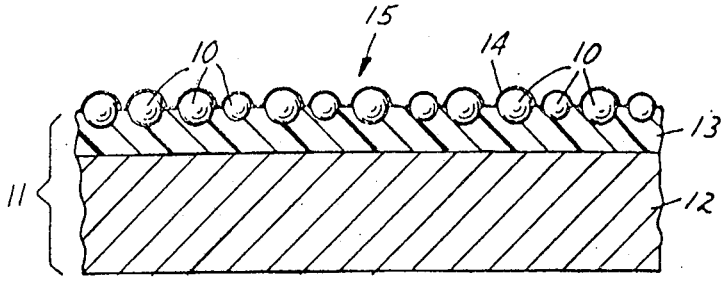
FIGS. 1 and 2 are enlarged sectional views of illustrative sheet materials prepared in the course of manufacturing retroreflectorization particles of the invention.

The steps in this example are discussed with reference to the illustrative showings in FIGS. 1 to 4. Visibly transparent glass microspheres 10, which averaged 60 micrometers in diameter and had a refractive index of 1.92, were coated in a monolayer onto a composite web 11 which comprised a Kraft paper 12 and a polyethylene layer 13. The web was heated so that the microspheres sank into the polyethylene layer 13 to approximately 30 percent of their diameters. The exposed microspheres were then vapor-coated with a layer 14 of aluminum in a thickness of approximately 250 angstroms to produce a web 15 as shown in FIG. 1.

Figure 2:
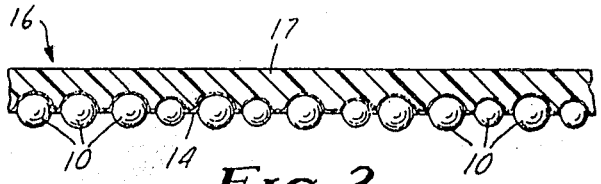
Figure 3:
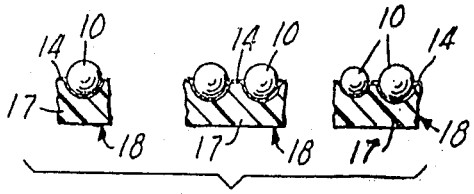
FIG. 3 is an enlarged sectional view of illustrative retroreflectorization particles of the invention.

A linear saturated hot-melt polyester adhesive material (Bostik 7979 manufactured by the Bostik Chemical Group of the USM Corporation, Middleton, Massachusetts; a typical useful polyester is the reaction product of terephthalic acid, isophthalic acid, ethylene glycol and neopentyl glycol) was dissolved in a solvent that was a mixture of equal parts of toluene and methyl ethyl ketone to give a 60-percent-solids solution. This solution was knife-coated over the aluminum layer 14 of the microspheres 10 of the web 15 at a wet thickness of 0.004 inch (100 micrometers) and then dried 10 minutes at 150° F. (66° C.) and 20 minutes at 200° F. (93° C.). The polyethylene-coated paper 1 was then stripped away leaving sheet material 16 as shown in FIG. 2, which comprised a monolayer of glass microspheres 10 each approximately hemispherically reflectorized by the aluminum 14 and partially embedded in a binder layer 17 of the polyester. The sheet material 16 was then placed in a Waring Blender and chopped to a fine particle size with the aid of a small amount of dry ice. The resulting retroreflectorization particles 18, as illustrated in FIG. 3, were retained on a 200-mesh (U.S. Standard) screen but passed an 80-mesh screen, meaning that their size was between 74 and 180 micrometers. In such particles the number of microspheres in the particles ranges from 1 to about 11.

Figure 4:
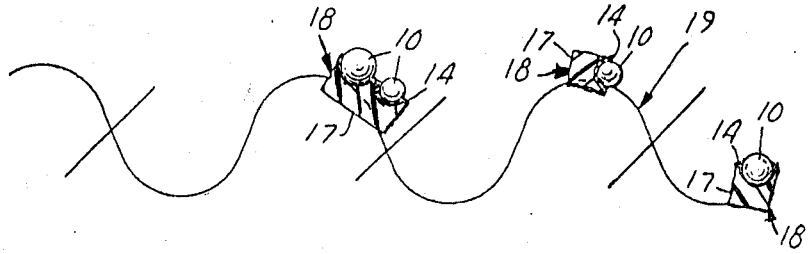
FIG. 4 is an enlarged schematic sectional view of a retroreflectorized fabric of the invention.

Particles 18 prepared in the above manner were uniformly dispersed over the surface of a dark blue denim fabric made from a blend of cotton and polyester fibers by pulling the fabric through a curtain of the particles as they were dropped from a vibrating inclined plane. The coated cloth was then placed in an oven heated to 350° F. (177° C.) for two minutes, whereupon the particles were bonded to the yarns and filaments of the cloth. A fabric 19 as illustrated in FIG. 4 resulted. To further improve nestling of the particles into crevices of the fabric, the fabric can be briefly ironed with a conventional laundry iron heated to about 300° F. (150° C.).

This fabric was tailored into jackets and pants and viewed under automobile headlamps. A person wearing the jacket and pants was quite visible at 300 feet with low beams and over 500 feet with high beams. The retroreflective efficiency varied over the surface of the fabric between 1.75 and 2.75 candella per square meter of fabric per lux of incident light. The concentration of microspheres was counted and measured as approximately 550 microspheres per square centimeter over the treated surface of the fabric. The microspheres were randomly oriented, meaning that their optically exposed surfaces faced in a variety of directions. At least about one-third of them were oriented so as to retroreflect light that is perpendicular to the surface of the fabric.

The garments prepared were laundered 50 times and found to show a retention of about 50 percent of their original retroreflective brightness. There were no other apparent changes to the garments after laundering in comparison with a control fabric that had not been treated. The garments had essentially the same hand, feel, and breathability as control garments that had not been treated, and the glass microspheres could be discovered only by a careful scrutiny of the garments. The overall appearance of the treated garments under ordinary daylight viewing was almost identical to that of the control garments.

EXAMPLE 2

A slurry was prepared from the following ingredients.

| | Parts by Weight |
|---|---|
| Emulsion of self-crosslinking acrylic copolymer latex particles in water (Rhoplex HA-8 made by Rohm and Haas) | 69 |
| 2-percent solution in water of methyl cellulose (Methocel 8000 made by Dow Chemical Co.) | 15 |
| 50-percent dispersion in water of a long-chain fatty acid antifoaming agent (Nopco DL 160 made by Nopco Chemical Co.) | 1 |
| Ammonium chloride (Catalyst A for the described acrylic emulsion made by Rohm and Haas) | 0.5 |
| Gamma-glycidoxypropyltrimethoxysilane (Dow Corning's Z6040) | 2.5 |
| Hemispherically-aluminum-coated transparent glass microspheres averaging 60 micrometers in diameter, having an index of refraction of 1.92, and treated with a sodium dichromate water solution according to the procedure outlined in U.S. Pat. No. 3,535,019, column 4, paragraph 2, to resist corrosion | 60 |

The first five ingredients of the formula were blended together using an ordinary propellor blade attached to an air mixer. After mixing to homegeneity (about 20 minutes) the hemispherically coated retroreflective microspheres were added and mixed for an additional 5 minutes. The volume concentration of microspheres in the resulting liquid coating composition was lower than used in typical commercial retroreflective coating compositions.

A steel cylinder approximately 10 centimeters in diameter was etched to provide a pattern of recessed bars 1.3 millimeter wide, 12.5 millimeters long, and 100 micrometers deep, located on centers separated from one another by 3.7 millimeters. The top surface of the cylinder was pressed against a rubber squeeze roll at a pressure of about 20 pounds per square inch (1.4 kilogram per square centimeter), and the bottom of the cylinder was dipped into a fountain of the slurry described above, with the excess being doctored off the cylinder with a steel blade. A cotton denim cloth was passed between the etched cylinder and rubber roll with its face side against the cylinder and the slurry was transferred to the cloth from the cylinder partly by contact and partly as a result of capillary absorption. The printed cloth was cured at 300° F. (150° C.) for 10 minutes and subsequently tailored into a jacket and pants for a child. The retroreflective efficiency was on the order of 8 candella per square meter per lux and when the garments were viewed at night using automobile headlights, visibility was excellent and the visual effect astonishing.

In a somewhat different type of printing process, binder material only is printed in a scattered pattern onto cloth. Then, while the binder material is tacky, hemispherically reflectorized microspheres are cascaded onto the cloth. Where they strike a dot of tacky binder material, the microspheres become adhered to the fabric. Such a process is of advantage, since very small areas of binder material may be applied which are especially hard to see even after microspheres have been adhered to the areas.

The practice of the invention illustrated by Example 1, that is, using retroreflectorization particles, is presently preferred. Such an approach has a minimal effect on appearance. In addition, it is an inexpensive practical method that makes efficient use of microspheres and binder material; the very small particles require little binder material to adhere them to the fabric, and there is no need for continuous binder material between particles.

The smaller the individual retroreflective areas and the lower the density of microspheres over the area of the fabric, the more inconspicuous is a treatment of the invention. Quite useful retroreflectivity and extreme inconspicuity are obtained with densities of 300–500 microspheres per square centimeter or less, especially with retroreflective areas that contain just a few microspheres (e.g. that average less than 10 microspheres per area). Conspicuity increases slightly as density or size of retroreflective area increases, but even densities of 1,000 microspheres per square centimeter can be substantially invisible to ordinary inspection; and densities as high as 2,000 microspheres per square centimeter provide useful inconspicuity. To achieve uniformity of effect, these density values preferably also apply to any area of the treatment occupying one square centimeter.

Small retroreflectorization particles provide the smallest retroreflective areas, and retroreflectorization particles of the invention can be prepared that average no more than about 3–5 microspheres per particle. Such particles generally have surface dimensions, and provide retroreflective areas on fabric having surface dimensions, of about 250 micrometers or less; while particles averaging 10 microspheres generally have surface dimensions, and provide retroreflective areas having surface dimensions, of about 500 micrometers or less.

In retroreflective treatments of the invention prepared by other means than retroreflectorization particles, as well as with retroreflectorization particles, the continuous areas of a treatment may include more than an average of 10 microspheres. Further, when the color of the retroreflectorization particles matches or blends with the underlying fabric, or is transparent (as in the case of treatments in which the microspheres are coated with transparent dielectric mirrors as subsequently described), the size of the continuous areas can be increased while still providing acceptable daytime inconspicuity. Larger retroreflectorization particles also have the advantage that they are in general optically more intact, since they have been subjected to fewer chopping operations. However, the retroreflectorization particles to be used on garment fabrics will generally always average no more than about 50 microspheres per particle. Even such particles are still quite minute, typically averaging less than one millimeter in surface dimension.

The small amount and discontinuous nature of the binder material applied by using retroreflectorization particles also minimizes the effect on hand, feel and breathability of a treated fabric. In general, to minimize effects on hand, breathability, and appearance for fabrics that are to be worn, the smallest surface dimension of the continuous areas of the treatment on the fabric should be less than 0.5 centimeter, preferably less than 0.25 centimeter, and more preferably less than 1 millimeter. The maximum surface dimension of the continuous areas also is preferably less than these values. It is also desirable for there to be over the treated surface of a fabric on the average less than a milligram of binder material and more preferably less than 0.5 milligram of binder material per square centimeter.

Generally, sufficient microspheres are included to provide at least one candella, and preferably at least 1.5 or 2 candellas, of reflected light per square meter of a treated surface per lux of light that is incident on the surface. On the other hand, to minimize daytime visibility, the treatment usually provides less than 20, more often less than 10, and most often less than 5, candellas per square meter of treated surface per lux of incident light.

A variety of binder materials can be used in the retroreflectorization particles. Often the binder material is a heat-activatable adhesive, softening upon exposure to elevated temperatures so as to wet and develop adhesion to the fabric. Examples of useful binder materials of this kind are polyesters, acrylics, polyurethanes, and polyamides. Use of a binder material that is of the same chemical class as the synthetic fibers of a fabric to which a treatment is being applied is often advantageous; for example, polyester binder materials are often preferred for fabrics that include polyester fibers. The binder material of a retroreflectorization particle may also be activated or softened in other ways, as by application of solvent.

Following application of the particles to a fabric, the binder material hardens as by cooling, loss of solvent or other volatiles, or by chemical reaction including cross-linking or polymerizing. Use of chemically reactive materials may be of special advantage, since they often melt at low or moderate temperatures and achieve a low-viscosity condition very rapidly after reaching the melting point. The result is that they rapidly wet and penetrate into fabric, and a treating operation can be performed at lower temperatures and/or with shorter heating cycles. Chemically reactive materials can also be obtained in forms that are quite brittle and friable before reaction, which assists in fracturing sheet material into retroreflectorization particles. Illustrative useful chemically reactive materials include thermosetting resin compositions such as epoxy-based resin compositions, melamine-formaldehyde resin compositions, and acrylic-based resin compositions.

The layer of binder material in a retroreflectorization particle may comprise two or more sublayers. For example, in some embodiments the microspheres are embedded in one sublayer of binder material, and a second sublayer of binder material is used to bond the particles to fabric.

The binder material in retroreflectorization particles may be rather rigid without affecting the hand or feel of the fabric, because the retroreflectorization partices are so small. Particles with a rigid binder material also tend to flow more freely. For treatments as described in Example 2, however, the binder material is desirably a flexible, even elastomeric, material. The preferred binder material is a water emulsion since it may be applied to a variety of fabrics, and in low concentration will have little if any effect upon the hand or feel of the fabric. Acrylic emulsions are preferred because they can be crosslinked to produce soft, flexible films resistant to alkaline solutions and with excellent adhesion to fabrics. Other useful emulsions are polyvinyl acetate and styrene-butadiene emulsions.

The transparent microspheres used in the invention are usually glass microspheres (the microspheres are generally visibly transparent though they may be transparent to other types of radiation which it is desired to reflect). Generally, when the optically exposed surfaces of the microspheres in a treatment of the invention have an air interface, the microspheres have an index of refraction of at least 1.8 and preferably about 1.9. At those indices, the microspheres achieve good retroreflective efficiency with specular reflective coatings applied directly to them. Microspheres of lower refractive index can be used by spacing the specular reflective means from the microspheres with materials of lower refractive index. And microspheres of high index of refraction, such as 2.5, can be used to obtain retroreflection when the microspheres are wet or covered with a transparent polymeric film.

The microspheres should average less than about 200 micrometers in diameter to achieve the least conspicuous treatment and preferably they are less than about 100 micrometers in average diameter. Most often the specular reflective means in a reflective treatment of the invention is provided by a coating of specular reflective material over an approximately hemispherical portion of the surface of the microspheres. Specular reflective coatings on the microspheres are often of a metallic material such as silver of aluminum, but they may also be dielectric reflective coatings such as taught in Bingham, U.S. Pat. No. 3,700,305. Such coatings, which can be visibly transparent while reflecting sufficient light to provide good retroreflection, may improve the color or appearance of a reflective treatment by letting an underlying color be visible through the reflective treatment.

Reflective means can also be provided by use of a specular reflective material in the binder material underlying the microspheres. For example, aluminum flakes may be dispersed in the binder material, or a continuous metal coating separated from the microspheres by a transparent spacing layer can be used. In addition, nacreous pigments such as described in Bingham, U.S. Pat. No. 3,758,192 may be used. Whatever the form, they are in optical connection with the microspheres; that is, rays to be reflected will pass through the microspheres and strike the specular reflective means.

The microspheres in a retroreflective treatment of the invention preferably have an air interface, but they may also be covered by a transparent layer having an index of refraction that causes the microspheres, in combination with the underlying reflective means, to be retroreflective. Such a structure is useful under either wet or dry conditions. The principles on which such a structure is based are taught in more detail in Palmquist et al, U.S. Pat. No. 2,407,680.

Retroreflective treatments of the invention may be provided on a variety of fabrics (fibrous sheet material). The invention is particularly beneficial with dark fabrics which have the least visibility at night. Textured fabrics are advantageous because of the nestling of reflectorization particles previously described. The fabrics may be prepared by a variety of techniques; e.g., they may be woven, knitted, or nonwoven.

While fabrics of the invention are most often made into garments, they are useful for other purposes such as portable traffic-control signs and flags. In such uses, a high density of microspheres may be applied to the fabric, even higher than that described above. Although retroreflectorization particles of the invention as illustrated by Example 1 are of special usefulness for forming discontinuous sparse retroreflective treatments, they may also be applied to form dense treatments.

What is claimed is:

1. Fabric treated on at least one surface with a discontinuous sparse retroreflective treatment that has low visibility in daylight but provides a bright retroreflection at night, said treatment comprising discrete separated retroreflective areas that each include a thin layer of binder material adhered to the fabric and separated from the binder material of other retroreflective areas, and one or more glass microspheres that average no more than about 200 micrometers in diameter supported as a monolayer in said layer of binder material; at least about one-third of microspheres adhered to the fabric in said retroreflective areas having specular reflective means in optical connection between them and the fabric and having their outwardly facing surface optically exposed for receiving and returning light rays, whereby they retroreflect incident light that is normal to the fabric; there being no more than about 2000 microspheres in any square centimeter of said treatment; and the maximum surface dimension of said retroreflective areas being no greater than about 1 millimeter.

2. Fabric of claim 1 in which said separated retroreflective areas each include on the average no more than about 50 microspheres.

3. Fabric of claim 1 in which said specular reflective means comprises a specularly reflective coating on the surface of the microspheres.

4. Fabric of claim 1 in which the binder material is a heat-activated adhesive.

5. Fabric of claim 1 in which there are on the average less than about 500 microspheres per square centimeter of said treatment.

6. Fabric of claim 1 in which the maximum surface dimension of said retroreflective areas is no more than about one-half millimeter.

7. A garment comprising at least one piece of fabric of claim 1.

8. Fabric treated on at least one surface with a discontinuous sparse retroreflective treatment that provides in aggregate at least about one candella per square meter of the fabric per lux of light incident on the fabric but leaves the fabric with nearly its full original hand, breathability, and appearance whereby the fabric may be made into comfortable garments having an inconspicuous daytime appearance, said treatment comprising discrete separated retroreflective areas that each include a thin layer of binder material adhered to the surface of the fabric and separated from the binder material of other retroreflective areas, and one or more transparent microspheres that average less than about 100 micrometers in diameter supported as a monolayer in said layer of binder material; at least about one-third of the microspheres adhered to the fabric in said retroreflective areas having specular reflective means in optical connection between them and the fabric and having their outwardly facing surface optically exposed for receiving and returning light rays, whereby they retroreflect incident light that is normal to the fabric; the maximum surface dimension of said retroreflective areas being no more than about one millimeter and there being no more than about 500 microspheres per square centimeter of said treatment.

9. Fabric of claim 8 in which said specular reflective means comprises a specularly reflective coating on the surface of the microspheres.

10. Fabric of claim 8 which provides a reflection in aggregate of less than about 10 candellas per square meter of the fabric per lux of light incident on the fabric.

11. Fabric of claim 8 in which the optically exposed surface of the microspheres is also physically exposed to the air above the binder material.

12. Fabric of claim 8 in which said discrete retroreflective areas include on the average no more than about 10 microspheres.

13. Fabric of claim 8 in which there are on the average less than about 300 microspheres per square centimeter of said treatment.

14. A garment comprising at least one piece of fabric of claim 8.

15. A method for providing a retroreflective treatment on a fabric comprising

A. depositing onto the fabric a free-flowing mass of retroreflectorization particles that comprise (1) on the average no more than about fifty transparent microspheres arranged in a closely packed monolayer; (2) a solid binder layer in which the microspheres are supported and which may at least in part be softened to adhere the particles to the fabric; and (3) specular reflective means underlying the monolayer of microspheres and supported by the binder layer in optical connection with the microspheres whereby the microspheres are made retroreflective; the surface of the microspheres opposite from the reflective means being optically exposed to receive and return light rays; and B. providing conditions to soften said binder layer, whereby at least a portion of said retroreflectorization particles become adhered to the fabric with the optically exposed surfaces of the microspheres facing away from the fabric.

16. A method of claim 15 in which said binder material can be softened with heat, and said conditions comprise the application of heat.

17. A method of claim 15 in which said monolayer of microspheres is partially embedded in the binder material and partially exposed, and the embedded surfaces of the microspheres are covered with a specular reflective coating.

18. A free-flowing mass of minute discrete retroreflectorization particles useful for forming a retroreflective coating on a substrate, said particles individually comprising on the average one up to about 50 transparent microspheres supported as a closely packed monolayer by a solid binder layer which may at least in part be softened to adhere the particles to a substrate; and specular reflective means underlying the microspheres and supported by the binder layer in optical connection with the microspheres to make the microspheres retroreflecting; the surface of the microspheres opposite from the reflective means being optically exposed whereby, when the particles are adhered to a substrate with said optically exposed surface facing away from the substrate, the microspheres will retroreflect light incident on the substrate.

19. Retroreflectorization particles of claim 18 in which the binder layer is softenable by heat.

20. Retroreflectorization particles of claim 18 in which said monolayer of microspheres is partially embedded in the binder layer and partially exposed; and the embedded surfaces of the microspheres are covered with a specular reflective coating.

21. Retroreflectorization particles of claim 18 which include on the average no more than about 10 microspheres.

22. Retroreflectorization particles of claim 18 in which said microspheres have an average diameter of no more than about 100 micrometers.

23. A free-flowing mass of minute retroreflectorization particles useful for forming a retroreflective coating on a substrate, said particles individually comprising on the average one up to about 50 transparent microspheres that have an average diameter of no more than about 100 micrometers and are arranged as a closely packed monolayer; a solid binder layer in which the microspheres are partially embedded and which may be softened with heat to adhere the particles to a substrate; and a specular reflective coating covering the embedded surfaces of the microspheres to make them retroreflecting; the surface of the microspheres opposite from the reflective means being optically exposed whereby, when the particles are adhered to a substrate with said optically exposed surface facing away from the substrate, the microspheres will retroreflect light incident on the substrate.

24. Retroreflectorization particles of claim 23 which include on the average no more than about 10 microspheres.

25. Retroreflectorization particles of claim 23 in which the specular reflective coating is metallic.

26. Retroreflectorization particles of claim 23 in which the specular reflective coating comprises a transparent dielectric material.

27. Retroreflectorization particles of claim 23 in which said binder layer comprises at least two sublayers, and the microspheres are partially embedded in one of the sublayers.

28. Fabric having retroreflectorization particles of claim 23 adhered to one surface at a density of less than 500 spheres per square centimeter of the surface.

29. A garment comprising at least one piece of fabric of claim 2.

30. Retroreflectorization particles of claim 18 in which the specular reflective means comprises nacreous pigment particles underlying the microspheres.

31. Retroreflectorization particles of claim 23 in which the specular reflective coating comprises nacreous pigment particles.

32. Retroreflectorization particles of claim 18 in which the specular reflective means comprises a transparent dielectric layer.

33. Fabric having retroreflectorization particles of claim 18 adhered to one surface.

34. A garment comprising at least one piece of fabric of claim 33.

35. A method of claim 15 in which said retroreflectorization particles comprise on the average no more than about ten microspheres.

*36. Fabric treated on at least one surface with a retroreflective treatment that comprises transparent microspheres distributed over the surface of the fabric in a discontinuous sparse arrangement and adhered there by a thin layer of binder material; the microspheres averaging no more than about 200 micrometers in diameter, and at least about one-third of the microspheres having specular reflective means in optical connection between them and the fabric to make them retroreflective, and having their outwardly facing surface optically exposed for receiving and returning light rays; there being no more than about 2000 microspheres in any area occupying one square centimeter of said treatment and the maximum surface dimension of discrete retroreflective areas of said treatment being no greater than about 1 millimeter, whereby the treatment provides low visibility in daylight but bright retroreflection at night.*

*37. Fabric of claim 36 in which discrete retroreflective areas of said treatment include on the average no more than about 10 microspheres.*

*38. Fabric of claims 36 or 37 in which there are on the average less than about 500 microspheres per square centimeter of said treatment.*

*39. A garment comprising at least one piece of fabric of claim 36.*

*40. Fabric of claim 36 in which the microspheres are hemispherically coated with specularly reflective material.*

* * * * *